Oct. 29, 1940.　　　P. H. BEGIN　　　2,219,585
DUMPING VEHICLE
Filed June 27, 1940　　　2 Sheets-Sheet 1

INVENTOR.
PETER H. BEGIN
BY Bates, Teare, & McBean
ATTORNEYS

Oct. 29, 1940.     P. H. BEGIN     2,219,585
DUMPING VEHICLE
Filed June 27, 1940     2 Sheets-Sheet 2

INVENTOR.
PETER H. BEGIN
BY Bates, Teare, & McBean
ATTORNEYS

Patented Oct. 29, 1940

2,219,585

UNITED STATES PATENT OFFICE 2,219,585

DUMPING VEHICLE

Peter H. Begin, Cleveland, Ohio

Application June 27, 1940, Serial No. 342,749

4 Claims. (Cl. 298—2)

This invention relates to dumping vehicles and has particular application for use in cemeteries where earth must be transported a considerable distance from an excavation to a dump heap.

An object of the invention is to make a dumping vehicle which may be placed at the end of a grave so that earth removed therefrom may be thrown directly into the vehicle body, then transported over low grave markers to a road and then connected in a train for transportation to a remote point.

A further object of the invention is to make a vehicle which has a frame that is sufficiently rigid to support the weight of the load and yet is light in weight. Additionally, the invention includes a tiltable body which may be turned completely over within the confines of the frame and which includes a latching device by means of which the body will be locked in load-receiving position merely by turning it back at the completion of the dumping operation.

Figure 1:
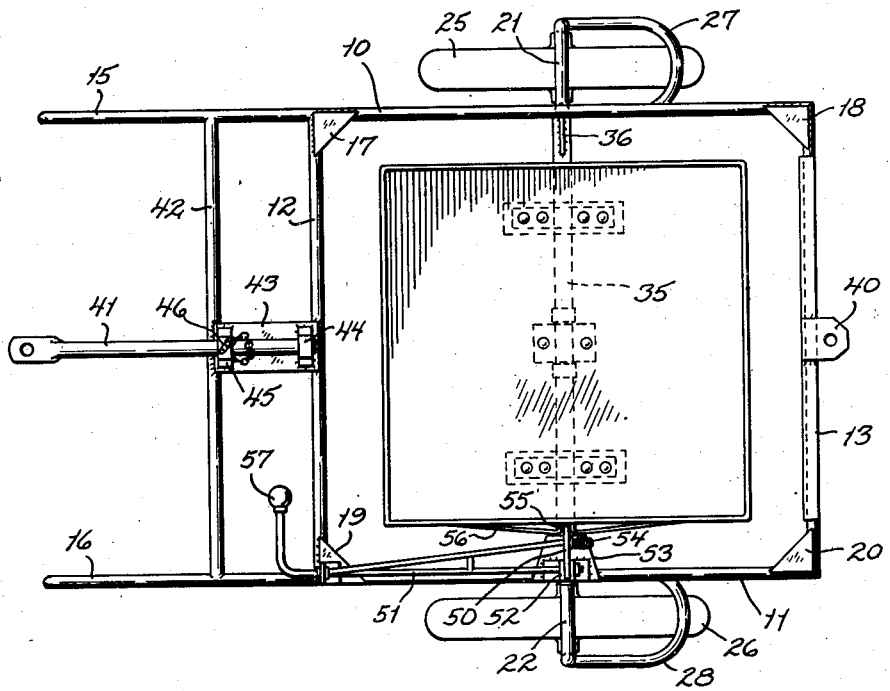
Figure 2:
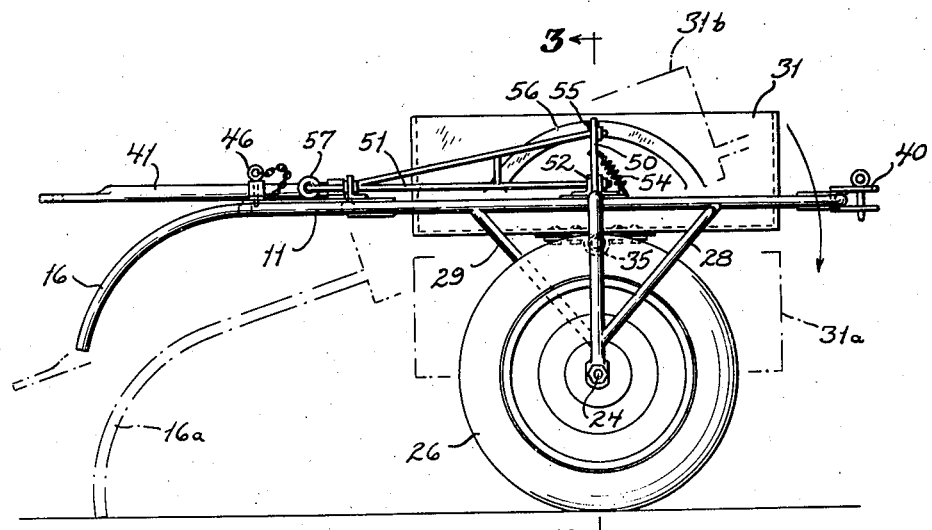
Figure 3:
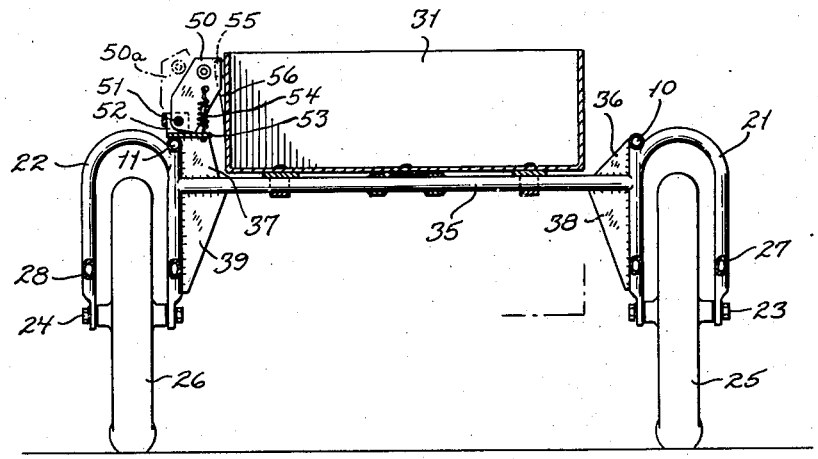
Figure 4:
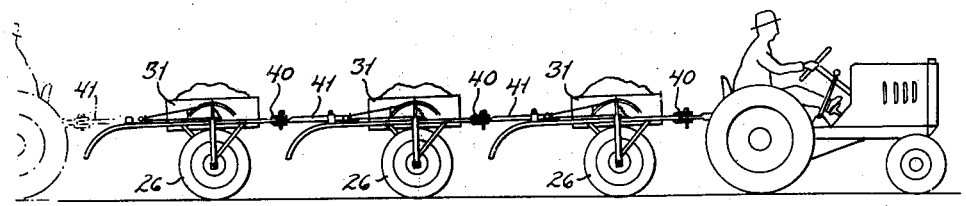

Referring now to the drawings, Fig. 1 is a top plan view of a dumping vehicle made in accordance with my invention; Fig. 2 is a side elevation of the vehicle shown in Fig. 1; Fig. 3 is a section taken on the line 3—3 in Fig. 2; Fig. 4 is a view illustrating a number of vehicles embodying my invention connected together in a train for transportation.

Designating the parts shown in the drawings by reference characters, the vehicle chassis comprises an open frame having side portions 10 and 11 and end portions 12 and 13 respectively. The portions 10 and 11 may continue beyond the portion 12 and extend downwardly and terminate in handles 15, and 16, respectively. The frame may be made of tubular members that are welded together and that are reinforced at the corners by plates 17, 18, 19 and 20 respectively.

The chassis, in addition to the open frame, includes wheel receiving yokes, each of which may comprise an inverted U-shaped tubular member indicated in general at 21 and 22, as being attached, as by welding, to the frame side portions 10 and 11 respectively. The lower ends of the yoke arms are adapted to receive pins 23 and 24 which serve as axles for the wheels 25 and 26 respectively. The connection between the yokes and frame may be reinforced by struts 27 and 28, each of which is shown as a U-shaped tubular member which extends diagonally upwardly from the arms of the yokes 21 and 22 respectively and which also may be welded to the frame portions 10 and 11 respectively. Additional bracing may be secured by struts 29 which extend diagonally from the inner leg of each yoke 21 and 22 to the frame.

The designated body 31 may comprise an open box, the bottom of which is pivotally supported on a bar 35 which extends transversely of the frame and is shown as being attached at its ends to the inner arms of the yokes 21 and 22 respectively. This connection may be reinforced by plates 36 and 37, which, as shown in Fig. 3, are welded to the bar 35, to the frame portions 10 and 11, and to the inner legs of the yokes 21 and 22 respectively. Additional bracing may be obtained by plates 38 and 39, which may be similarly fastened to the under portions of the bar 35 and to the inner legs of the yokes 21 and 22 respectively. This assembly results in a chassis that is light in weight and yet has sufficient strength to permit the transportation of a load of earth across uneven ground without weaving or distortion of the frame.

In Fig. 2, the full lines 31 show the normal position of the body for receiving a load, whereas the broken lines 31a illustrate the inverted position. The clearance between the ends of the frame and the body is sufficient to permit the body to be pivoted about the bar 35 without disturbing the horizontal position of the frame. Moreover, the distance between the pivot and either end of the body is less than the distance between the pivot and the ground, and hence, the load may be dumped while the vehicles are attached together in a train in a manner hereinafter set forth. To facilitate the loading operation, the vehicle may be supported by resting the handles upon the ground as shown by the broken line position 16a in Fig. 2, at which time the body occupies the position shown by the broken line 31b in Fig. 2.

The vehicle illustrated herein is adapted to be connected in a train as previously set forth, and to this end, I have shown a clevis 40 on the end frame member 13 and I have shown an apertured rod 41 extending from the frame portion 12 for engaging a clevis on a coacting vehicle as shown in Fig. 4. To support the bar 41, I may provide a cross-bar 42 which extends between the frame pieces 10 and 11 and parallel to the end portion 12. The bars 12 and 42 may then support a plate 43 on which are mounted brackets 44 and 45 respectively. The bar 41 may be loosely fitted within the bracket and held therein by means of a detachable pin 46 as shown in Figs. 1 and 2. This arrangement enables the bar 41 to be removed whenever the vehicle is tilted to load-receiving position, and thereby to provide more clearance during the loading operation, or whenever the vehicle is used as a hand truck.

To hold the body in load-receiving or upright position, I have illustrated a locking device which may take the form of a latch 50 which is shown in the form of a plate that is pivoted at 51 in a bracket 52. The bracket may be supported on a plate 53 which is shown as being fastened to the frame piece 11 and to the reinforcing plate 37. A spring 54 normally urges the plate into the full line position shown in Fig. 3, where it is adapted to engage a shoulder or notch 55 in an arcuate cam 56, which is attached to the one side of the body 31.

Normally, the latch enters the notch 55 and holds the body in the load receiving position, but to release the body so that it may be inverted, the latch may be manually withdrawn from the notch. This may be done by lifting a handle 57 which is shown as being formed on a lateral extension of the pivot 51. To facilitate the inversion of the body, I may mount it slightly off center upon the bar 35, but the same results can be accomplished in practice by loading one portion of the body more than another portion so that an unbalanced effect will be obtained. In this way the tilting of the body is accomplished merely by lifting the handle 57 and thereby withdrawing the latch 50 from engagement with the notch 55.

A vehicle made in accordance with the present invention is suitable for use in locations where it is necessary to clear low lying objects, such as grave markers which project about a foot above the ground. The vehicle is well suited for use either as a hand truck, or as a trailer, and in the latter use it is well adapted for connection in tandem with other similarly made vehicles. The latching device permits automatic tilting of the body, and accomplishes automatic locking whenever the body is returned to the load receiving position. In this way loads may be quickly dumped by the tractor operator without disconnecting the vehicles from the tractor or from each other.

I claim:

1. A dumping vehicle comprising a chassis portion including a pair of spaced side members and a pair of end members which define an open frame, a yoke fastened to each side member and extending downwardly therefrom, a wheel journalled in each yoke, the frame being disposed near the tops of the yokes, a bar extending transversely of the frame and adjacent the mid-portion thereof, a body having the bottom thereof pivotally mounted on said bar, the distance from the bar to either end of the body being less than the distance between the body and the ground, whereby, the body may be rotated about the bar without striking the ground.

2. A dumping vehicle comprising a chassis portion including an open frame having spaced side members, each of which terminates at one end thereof in a handle, and having a pair of end members, wheel supports extending downwardly from the frame and having means thereon for journalling a pair of wheels, said supports having a length substantially equal to the radius of the wheels, whereby the frame is disposed adjacent the tops of the wheels, a bar extending transversely of the frame, a body pivotally mounted upon the bar, the distance between the pivot and each end of the body being less than the distance between the bar and the ground, whereby the body may be rotated about the pivot to discharge the contents thereof directly beneath the frame, and means on the frame for automatically locking the body in load-receiving position upon rotation thereof about said pivot.

3. A dumping vehicle comprising a chassis portion, including an open frame, inverted U-shaped yokes, rigidly attached to the frame and extending downwardly therefrom, a wheel journalled in each yoke, a body pivotally supported within the confines of the frame, the bottom of the body being disposed near the top of the wheels, and a locking device including an arcuate cam having a latching shoulder therein on the body, and including a latching member pivoted to the frame and adapted to engage said shoulder, and means attached to the latching member and extending along the frame for manipulating the member to effect disengagement from said shoulder, whereby the body when released is free to rotate about its pivotal connection with the frame.

4. A dumping vehicle comprising an open frame including a pair of side members and a pair of end members, the side members continuing beyond one of the end members and extending downwardly and providing handles for manipulating the vehicle, a pair of wheels, means carried by the frame for journalling the wheels and for supporting the frame above the tops of the wheels, a bar extending transversely of the frame and near the median line between the end members thereof, a body having the bottom thereof pivotally supported on said bar, and means on each end member for connecting the vehicle to another similarly formed vehicle in tandem relationship.

PETER H. BEGIN.